Dec. 9, 1930.   I. W. BROGGER   1,784,417
ELECTRICAL INDICATING INSTRUMENT
Filed Nov. 18, 1929
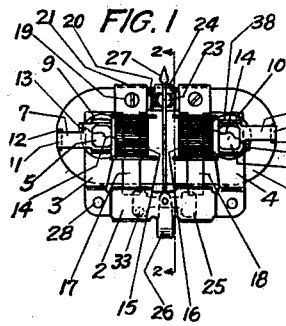
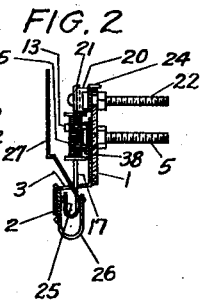
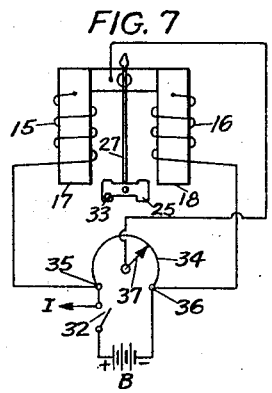
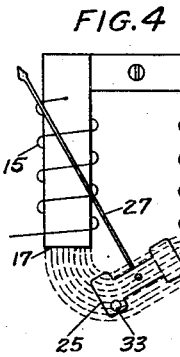
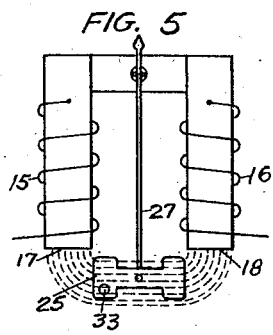
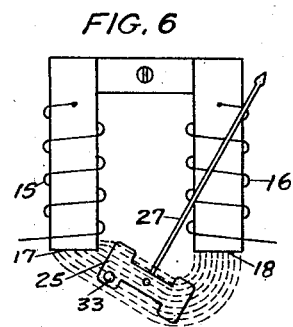
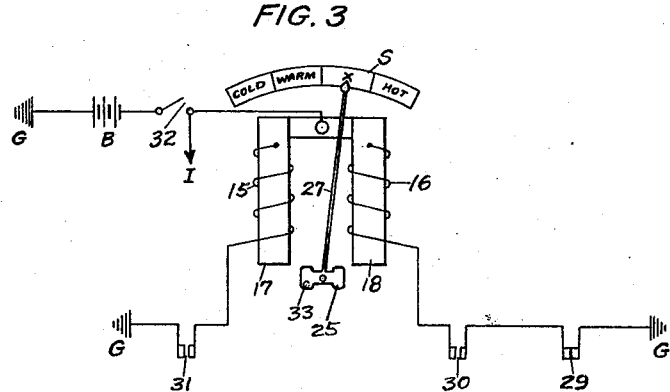
INVENTOR
IVAR W. BROGGER
BY
A. D. T. Libby
ATTORNEY Patented Dec. 9, 1930

1,784,417

UNITED STATES PATENT OFFICE

IVAR W. BROGGER, OF SPRINGFIELD, NEW JERSEY, ASSIGNOR TO TIFFANY MANUFACTURING COMPANY, OF NEWARK, NEW JERSEY

ELECTRICAL INDICATING INSTRUMENT

Application filed November 18, 1929. Serial No. 407,904.

This invention relates to an electrical indicating instrument suitable for a plurality of uses, at least two of which will be described herein.

One of these uses is that of indicating the temperature of an internal combustion engine, while a second use is that of indicating the depth or amount of fluid in a receptacle such as an automotive vehicle gasoline tank. Other uses may be found for the instrument after a reading of the specification taken in connection with the annexed drawing.

The principal object of my invention is to provide an indicating instrument which is small and compact, yet one which is positive in its action and cheap to manufacture.

Another object of my invention is to provide an indicating instrument which is operated electrically, and therefore one which may be installed at a distance from the apparatus on which it is to give indications or conditions of operations. In the drawing:

Figure 1 is a plan view of the working parts of the instrument without the casing carrying these parts.

Figure 2 is a view on the line 2—2 of Figure 1.

Figure 3 is a diagrammatic view showing the application of the instrument to an automotive vehicle, whereby the temperature conditions of the engine may be indicated.

Figure 4 is a diagrammatic view showing one position of the indicator.

Figure 5 is a view similar to Figure 4, but showing another position of the indicator.

Figure 6 shows still another position of the indicator.

Figure 7 is a diagrammatic view showing the use of the indicator as a depth gauge in an automotive vehicle gasoline tank, or as a depth gauge in any other fluid container.

The working parts of the instrument as shown in Figures 1 and 2, consist of a strip 1 of strong insulating material on which is carried a bracket 2, having arms 3 and 4 extending therefrom. The arms 3 and 4 are fastened to the insulator 1 by studs 5 and 6 respectively, which studs pass through their respective arms, but are insulated therefrom. Beneath the heads of the studs 5 and 6, are carried clips 7 and 8, being separated from the arms 3 and 4 by insulators 9 and 10. Each of the ends of the clips 7 and 8 has a prong 11 turned downward to engage a slot 12 in the insulator to prevent the clips 7 and 8 from shifting in position. Likewise, each of the clips 7 and 8 is provided with an upturned finger 13 for attaching the end 14 of each of the coils 15 and 16; also, the clips have side flanges 38 to engage the flat side of the heads of studs 5 and 6.

The coils 15 and 16 are provided with cores 17 and 18 of magnetic material. Preferably, these cores are rectangular in shape and are fastened in any suitable manner as by screws 19 to a yoke member 20. Preferably, the ends 21 of the cores 17 and 18 are bent over the side of the yoke 20, as shown in Figure 2, so as to positively align the cores on the yoke 20 which is fastened to the insulator 1 by a stud 22, the head 23 of the stud 22 being set in a depressed portion of the yoke 20. The yoke 20 has a lip 24 turned downwardly over the edge of the insulator 1 so as to prevent the yoke from shifting in position on the said insulator.

The ends of the coils 15 and 16 are connected to their respective cores so that the stud 22 acts as a common electrical connection for both of these coils.

The free ends of the cores 17 and 18 extend somewhat under the bracket 2 for the purpose of acting on an armature 25, which is supported between an arm 26, formed from the bracket 2, and the body portion of the bracket. The armature 25 carries a pointer 27 which indicates the position of the armature as it is actuated by the magnetic flux coming from the ends of the cores 17 and 18. This armature and pointer construction is similar to that shown in Mason Patent 1,680,465, issued August 14, 1928, and will not be further described herein.

The bracket 2 is provided with holes 28 for mounting an indicating scale thereon. The moving parts of the instrument are held in the casing by means of suitable insulators and nuts fitting the studs 5, 6, and 22, which pass through the casing to the exterior thereof, whereby electrical connections may be made to the instrument.

Coming now to a practical application of the instrument, reference is made to Figure 3, wherein contacts 29, 30, and 31, are three contacts included in a thermostat of the plug type which is adapted to be screwed into some part of the chamber carrying the liquid fluid for cooling the cylinders of the engine. 32 is the ignition switch which is in closed position when current is passing from battery B to the ignition circuit I. On an automobile it is usual to ground the battery B to the frame of the vehicle as indicated at G. The scale of the instrument is indicated at S. When used in a system of this kind, the contact 29 is normally closed, while the contacts 30 and 31 are normally open. After the engine is started and the heat of the engine or radiator reaches a certain point, the contact 30 first closes, thereby bringing into circuit the coil 16, under which condition the armature 25 and pointer 27 will take the position as shown in Figure 4, it being understood that when the engine is cold, the pointer 27 will be in the "cold" position, which is very close to that of Figure 4, it being understood that the armature is held in this normal position closely adjacent to "cold" by means of a small counter-weight 33.

Due to the fact that the armature is very close to the position shown in Figure 4 when current is applied to the coil 16, it will be readily understood that the armature will be held in the position shown in Figure 4, as the end of the core 18 will be nearest to the armature, and the action of the magnetic flux will be such as to hold it in the position shown in Figure 4.

As the temperature of the radiator or the cooling fluid increases, the contact 31 will close, thereby bringing the coil 15 into circuit, and the armature and pointer will take the position shown in Figure 5, which as shown, will be on one side of the "warm" position. As the temperature further increases, the thermostat acts to open the contact 29, thereby interrupting the circuit through the coil 16, and the armature and pointer will take the position as shown in Figure 6, which is the "hot" position, thereby indicating to the operator that attention should be given to the cooling of the engine.

It is to be understood that the coils 15 and 16 are wound or connected so as to give the proper polarity whereby they will act on the armature 25 as above set forth, wherein it is shown that the indicator has three definite positions in addition to the zero position, which is determined by gravity control.

In order to have the pointer read clearly over the four divisions of the scale, as shown in Figure 3, it is preferable to offset the pointer from its normal axis so that with both the coils 15 and 16 in operation, the pointer 27 will read slightly to one side of the middle of the device, as indicated by X in Figure 3, which shows the maximum operating efficiency of the engine.

In Figure 7, the instrument is used as a depth gauge, no scale, however, being shown. In this arrangement 34 is a potentiometer rheostat having terminals 35 and 36. The arm 37 of the potentiometer is controlled by a float, not indicated, in the tank or container through a suitable mechanical coupling. As the float is raised and lowered by the level of the liquid in the container, the arm 37 is moved accordingly. When the contact arm 37 is at 35, the coil 15 is short-circuited and the coil 16 will have the full potential of the source of current B applied thereto, and the armature and pointer will take the position as indicated in Figure 4, which will be for example, the "empty" position of the tank.

As the contact arm 37 is moved away from 35 across the potentiometer 34, the current will pass at an increasing rate through the coil 15 and at a decreasing rate through the coil 16, the armature and pointer following the direction of the resulting magnetic field produced by the two coils until the contact arm 37 reaches the point 36, when the coil 16 will be short-circuited, leaving a full voltage across the coil 15, and the armature and pointer will be in the position shown in Figure 6, which will be the "full" position of the tank or container.

The rate of increase or decrease of the indicator in accordance with the position of the float can be determined or controlled by suitably shaped iron cores 17 and 18, or by giving the armature 25 the desired shape, depending on whether or not a uniform scale is desired. The character of the scale can also be determined or controlled by the method of winding the resistance part of the potentiometer, which winding may be uniform or irregular or staggered, to suit any desired purpose.

As shown in Figure 3, the pointer 27 is shown with an offset or bend in it, while the armature 25 is shown in horizontal position. Since Figures 4, 5, and 6, are merely diagrammatic in character, this offset has not been shown.

It is to be understood that the cores 17 and 18 may be punched integral with the yoke 20, thereby giving a U-shaped lamination for the core, and the claims are intended to cover such a magnetic structure; that is to say, where the claims refer to a pair of cores, it is to be understood that these cores may be integral with the yoke, or separate therefrom, as shown in Figure 1.

Having thus described my invention, what I claim is:

1. An electrical indicating instrument including an insulator, a metallic yoke carried by the insulator, a pair of coils having cores spaced apart and fastened to opposite ends of said yoke, said cores extending in the same direction from the yoke and projecting as free ends beyond the coils, a bracket having arms extending from opposite ends thereof and engaging said insulator, a contact stud for holding each arm on the insulator, means for making connections from the end of each coil to its associated stud, a centrally located arm extending from the bracket toward the coils, an armature having a pointer associated therewith and pivoted between the end of said central arm and the body of the bracket and in operative relation to said free core ends, each of said coils having one of their ends connected to their respective cores and a contact stud carried by said yoke.

2. An electrical indicating instrument including an insulator, a metallic yoke carried by the insulator, a pair of coils having cores spaced apart and fastened to opposite ends of said yoke, said cores extending in the same direction from the yoke and projecting as free ends beyond the coils, a bracket having arms extending downward and away from opposite ends of the bracket into engagement with said insulator, means for fastening said arms to the insulator, said means serving also as terminals for the end of said coils, an armature pivotally mounted on the bracket in operative relation to said free core ends, a pointer actuated by the armature, each of said coils having one of their ends connected to their respective cores and a contact stud carried by said yoke.

3. An electrical indicating instrument including an insulator, a metallic yoke carried by the insulator, a pair of coils having cores spaced apart and fastened to opposite ends of said yoke, said cores having their yoke ends formed to engage the sides of the yoke, said yoke having a central depression, a contact stud having its head seated in said depression and extending through the insulator, each of said coils having one end thereof connected to its core, said cores extending as free ends beyond said coils, a bracket having support arms resting on the insulator and holding the body of the bracket above the plane of the insulator, means for fastening said arms to the insulator, means for connecting the ends of said coils, one each, to each of said fastening means, and an armature carrying a pointer pivotally supported by said bracket in operative relationship to said core free ends.

4. An electrical indicating instrument including an insulator, a metallic yoke carried by the insulator, a pair of coils having cores spaced apart and fastened to opposite ends of said yoke, said cores having their yoke ends formed to engage the sides of the yoke, said yoke having a central depression, a contact stud having its head seated in said depression and extending through the insulator, each of said coils having one end thereof connected to its core, said cores extending as free ends beyond said coils, said yoke having means engaging the insulator to prevent the yoke from turning, a bracket having support arms resting on the insulator, a clip disposed over the ends of each of said arms, but insulated therefrom, said clips having upturned side flanges, a contact stud passing through the arm and insulator and having a head with flat sides to fit between said flanges, means for preventing the clips from turning on the insulator, said clips having means for connecting its associated coil end thereto, and an armature carrying a pointer pivotally supported by said bracket in operative relationship to said core free ends.

5. An electrical indicating instrument including an insulator, a metallic yoke carried by the insulator, a pair of coils having cores spaced apart and fastened to opposite ends of said yoke, said cores extending in the same direction from the yoke and projecting as free ends beyond the coils, a bracket having arms extending from opposite ends thereof and engaging said insulator, means for fastening said arms to the insulator, means for making electrical connections with said coils, and an armature carrying a pointer pivotally supported by said bracket in operative relationship to said core free ends.

6. An electrical indicating instrument including an insulator, a yoke non-rotatably carried on the insulator, a pair of cores rigidly fastened at opposite ends of the yoke, a bracket having arms at opposite ends extending into engagement with the insulator, an armature pivotally supported by the bracket adjacent the free ends of said cores, a pointer operated by the armature, windings on said cores, and means for making connections thereto, at least a part of said means acting to hold said bracket arms to the insulator.

7. An electrical indicating instrument including an insulator, a yoke non-rotatably carried on the insulator, a pair of cores rigidly fastened at opposite ends of the yoke and extending in the same direction and substantially at right angles thereto, a bracket having arms at opposite ends fastened to the insulator on opposite sides of said cores, an armature pivoted on said bracket adjacent the free ends of said cores, a pointer operated by said armature, windings on said cores, and means for making electrical connections thereto, said insulator carrying a terminal stud common to both windings.

8. An electrical indicating instrument having all its operative parts mounted on a single insulator, said parts comprising, a yoke, a pair of cores fastened at one end to the yoke and extending therefrom in spaced relation, a bracket having arms disposed on opposite sides of said cores and resting on the insulator, an armature carrying a pointer pivotally supported on the bracket in operative relation to the free core ends, windings on said cores, and contact studs for passing current to the windings, a pair of said studs also acting to hold the bracket arms to the insulator.

9. An electrical indicating instrument having all its operative parts mounted on a single insulator, said parts comprising, a metallic yoke having a contact stud passing through the insulator, a pair of cores fastened at one end to the yoke and extending in the same direction therefrom in substantially parallel relationship, a bracket having arms resting on the insulator, contact studs passing through the arms and insulator but insulated from the arms, an armature pivoted on the bracket adjacent the free ends of the cores, a pointer operated by the armature, coils on said cores, one end of each coil being connected to the yoke stud, while the other end of each coil is connected each to one of said bracket arm studs.

10. An electrical indicating instrument including an insulator, a yoke non-rotatably carried on the insulator, a pair of cores rigidly fastened at opposite ends of the yoke, a bracket carried by the insulator, an armature pivotally supported by the bracket adjacent the free ends of said cores, a pointer carried by the armature at a point to one side of the true axis of the armature, windings on said cores, and means for making connections thereto, said means including a pair of studs which also act to hold the bracket to the insulator.

11. An electrical indicating instrument including an insulator, a metallic yoke rigidly carried on the insulator, a pair of cores rectangular in cross-section non-rotatably fastened one each at opposite ends of the yoke, a bracket carried by the insulator adjacent the free ends of the cores, an armature pivotally supported by the bracket near said free ends of said cores, a pointer carried by the armature, windings on the cores, common means for conveying current to one end of both coils, and independent means for conveying current to the opposite ends of each of the coils.

In testimony whereof, I affix my signature.

IVAR W. BROGGER.